(12) United States Patent
Shimi et al.

(10) Patent No.: US 7,336,417 B2
(45) Date of Patent: Feb. 26, 2008

(54) METHOD OF MEASURING BIOLOGICAL SAMPLE WITH HIGH ACCURACY

(75) Inventors: Takeshi Shimi, Koganei (JP); Tokuko Haraguchi, Koganei (JP)

(73) Assignee: National Institute of Information Communications Technology, Incorporated Administrative Agency, Tokyo (JP)

( * ) Notice: Subject to any disclaimer, the term of this patent is extended or adjusted under 35 U.S.C. 154(b) by 395 days.

(21) Appl. No.: 10/977,550

(22) Filed: Nov. 1, 2004

(65) Prior Publication Data

US 2005/0120804 A1    Jun. 9, 2005

(30) Foreign Application Priority Data

Nov. 6, 2003    (JP)    ............................. 2003-377522

(51) Int. Cl.
G02B 21/34    (2006.01)
(52) U.S. Cl. ....................................... 359/398; 356/246
(58) Field of Classification Search ................ 359/391, 359/396, 398; 356/244, 246; 206/460
See application file for complete search history.

(56) References Cited

U.S. PATENT DOCUMENTS

| | | | | |
|---|---|---|---|---|
| 4,777,020 A | * | 10/1988 | Brigati | ......................... 422/99 |
| 6,428,751 B1 | * | 8/2002 | Solazzi | ........................ 422/102 |
| 2001/0030799 A1 | * | 10/2001 | Russell | ........................ 359/368 |

FOREIGN PATENT DOCUMENTS

DE    3542077    *    7/1986

* cited by examiner

*Primary Examiner*—Mark A. Robinson
(74) *Attorney, Agent, or Firm*—Westerman, Hattori, Daniels & Adrian, LLP.

(57) ABSTRACT

A displacement prevention sheet that, in order to inhibit a sample from deviating at the time of measurement with a microscope, is disposed between a sample holder in which the sample is set and a sample holder mounting stage on which the sample holder is mounted, wherein at least part of both surfaces of the displacement prevention sheet is provided with displacement prevention means.

10 Claims, 9 Drawing Sheets
(1 of 9 Drawing Sheet(s) Filed in Color)

(a)

(b)

(a)

(b)

(c)

(d)

METHOD OF MEASURING BIOLOGICAL SAMPLE WITH HIGH ACCURACY

BACKGROUND OF THE INVENTION

1. Field of the Invention

The present invention relates to a displacement prevention sheet that minimizes the displacement of a microscope measurement sample, a microscope that contains such a displacement prevention sheet, and a measurement method of a biological sample with such a microscope.

2. Description of the Related Art

When a sample is measured with a microscope, it is preferable that an observation target does not move. Thus, an optical microscope with an earthquake resistant bench that inhibits a sample from displacing owing to the shake of a device (such as LSM510 META manufactured by Carl Zeiss Jena GMBH) is sold. As is shown in FIG. 1, a previous microscope 1 includes, for instance, a stage 2 on which a sample that is to be observed is mounted, a stage position controller 3, an objective lens (not shown) and an eyepiece lens 4. A microscope on an earthquake resistant bench does not move even when the surroundings of the microscope vibrates.

As a method of observing a certain sample with a microscope, there is a method in which a sample is placed on a glass substrate (slide glass), thereon a thin glass plate such as a cover glass is overlaid, and then the sample is observed. In the case of such a measurement, in order to inhibit the glass substrate from moving, an arm is used to apply pressure to hold down the glass substrate (slide glass).

Among microscopes that are used for fluorescence observation of biological samples, there is a type in which in order to keep a temperature constant, a glass bottom dish on which a sample is mounted is buried in a recess disposed on a stage of a microscope. FIG. 2A is a diagram showing an appearance of a glass bottom dish 5 that mounts a sample and a recess 6 for the glass bottom dish disposed on the stage of a microscope. An inside diameter of the recess 6, in consideration of taking out the glass bottom dish after it is disposed, is slightly larger than the outside diameter of the glass bottom dish 5. Accordingly, in an existing optical microscope, as shown in FIG. 2B, owing to difference between diameters of the recess 6 and the glass bottom dish 5, a gap 7 is generated. When a biological sample is measured according to the fluorescence measurement by use of an optical microscope and so on, normally, a region of micrometer order is observed and in some cases a region of substantially 1 μm is measured. In the existing optical microscope, owing to the gap in a portion where the glass bottom dish including a sample is buried, the sample is unavoidably displaced during the measurement, resulting in a problem in that proper measurement cannot be carried out.

The present invention intends to provide a displacement prevention sheet that can inhibit a sample from deviating during observation with a microscope and a microscope that uses such a displacement prevention sheet.

The present invention further intends to provide a displacement prevention sheet that, in a microscope that uses a glass bottom dish, when it is inserted in a recess, inhibits the glass bottom dish from deviating; a microscope that uses such a displacement prevention sheet; and a measurement method of a biological sample that uses such a microscope.

SUMMARY OF THE INVENTION

At least one of the abovementioned problems can be solved according to inventions below.

(1) A first invention relates to a displacement prevention sheet that, in order to inhibit a sample from deviating during a measurement with a microscope, is placed between a sample holder that holds a sample and a sample holder mounting stage that mounts the sample holder, at least part of both surfaces thereof being provided with displacement prevention means. According to the invention, during the measurement with a microscope, a situation where a sample deviates can be inhibited from occurring. Accordingly, even in the case where a measurement region is narrow, like in the measurement of a biological sample, the sample can be inhibited from deviating, resulting in proper measurement.

(2) A preferable aspect of the first invention relates to the displacement prevention sheet having a hollow circular shape. When the sheet has such a shape, during the observation by use of the glass bottom dish, the glass bottom dish can be inhibited from deviating.

(3) Another preferable aspect of the first invention relates to the displacement prevention means being a portion consisting of an adhesive resin.

(4) Still another preferable aspect of the first invention relates to the displacement prevention sheet, an adhesive force of at least one surface being in the range of 10 to 1000 gf/10 mm. When the adherence is in this extent, the glass bottom dish can be inhibited from deviating and the displacement prevention sheet can be also taken off the microscope. In order to obtain such the adherence, for instance, as the displacement prevention means, one having the adherence (such as one on a surface of which an adhesive or adhesive resin is coated) has only to be adopted. When such adhesive displacement prevention means are used and a sample is pressed down with the displacement prevention means, the adherence between the sample and the displacement prevention means can be improved; accordingly, the sample can be more effectively inhibited from deviating.

(5) Another preferable aspect of the first invention relates to the displacement prevention means being an adhesive member. As the adhesive member, a known adhesive agent can be used and thereby the sample can be inhibited from deviating.

(6) Still another preferable aspect of the first invention relates to the displacement prevention sheet that has a hollow circular shape of which diameter is in the range of 60 to 64.9 mm or 35 to 39.9 mm. When the sheet has such a magnitude, it can be effectively used for inhibiting a glass bottom dish that is presently commercially available form deviating.

(7) A second invention relates to a microscope provided with the displacement prevention sheet according to any one of the first six aspects of the present invention. According to such a microscope, in the case of a biological sample being observed in particular, the sample can be inhibited from deviating. Accordingly, such a microscope can be particularly preferably used in the observation of the biological sample.

(8) A preferable aspect of the second invention relates to the microscope according to the second invention, the microscope having a cylindrical recess for mounting a glass bottom dish on a stage, the displacement prevention sheet being disposed in the recess.

(9) A third invention relates to a measurement method due to the microscope according to an aspect of the second invention and a measurement method of a biological sample by use of such a microscope. When the displacement prevention sheet and the microscope provided with the displacement prevention sheet are used, the sample can be alleviated in moving during the measurement.

(10) Another preferable aspect of the third invention relates to a measurement method of a biological sample that uses the microscope according to the third invention. When the fluorescence measurement of a biological sample is carried out by use of an optical microscope, normally a region of micrometer order is observed and in some cases a region of substantially 1 μm is measured. When the sample is made not to move, there is no need for application of such a correction; accordingly, workloads can be alleviated. Furthermore, when the sample is made not to move, the reliability of data is increased.

According to the invention, a displacement prevention sheet that can inhibit a sample from deviating during the observation with a microscope and a microscope that uses such a displacement prevention sheet can be provided.

According to the invention, a displacement prevention sheet that can inhibit a sample from deviating, in particular, a displacement prevention sheet that in a microscope that uses a glass bottom dish, by disposing in a recess where the glass bottom dish is inserted, can inhibit the glass bottom dish from deviating; a microscope that uses such a displacement prevention sheet; and a measurement method of a biological sample that uses such a microscope can be provided. Thereby, a measurement with time of a biological sample in particular can be properly carried out.

BRIEF DESCRIPTION OF THE DRAWINGS

The application file contains at least one drawing executed in color. Copies of this patent application publication with color drawing(s) will be provided by the Office upon request and payment of the necessary fee.

FIG. 2A is a diagram showing a situation where the glass bottom dish is disposed in a recess 6. FIG. 2B is a diagram showing relationship between the glass bottom dish when the glass bottom dish is disposed in the recess and the recess.

FIG. 3A shows hollow circular one and FIG. 3B shows circular one.

FIG. 4A shows one in which a plurality of prisms is mounted on a sheet or integrally molded with a sheet; FIG. 4B, one in which a plurality of rectangular portions is mounted on a sheet or integrally molded with a sheet; and FIG. 4C, one in which a plurality of columnar projections is mounted on a sheet or integrally molded with a sheet. FIG. 4D shows an example of a displacement prevention sheet that contains a sheet portion and an adhesion member portion.

FIG. 5A shows how to dispose a displacement prevention sheet according to the invention. FIG. 5B is a diagram showing an example of relationship between a displacement prevention sheet when the displacement prevention sheet is disposed in a recess on a stage and a recess. FIG. 5C is a diagram showing an example of relationship, when a glass bottom dish is disposed in a recess subsequent to FIG. 5B, between the recess, the displacement prevention sheet and the glass bottom dish.

DESCRIPTION OF THE PREFERRED EMBODIMENTS

Figure 1:
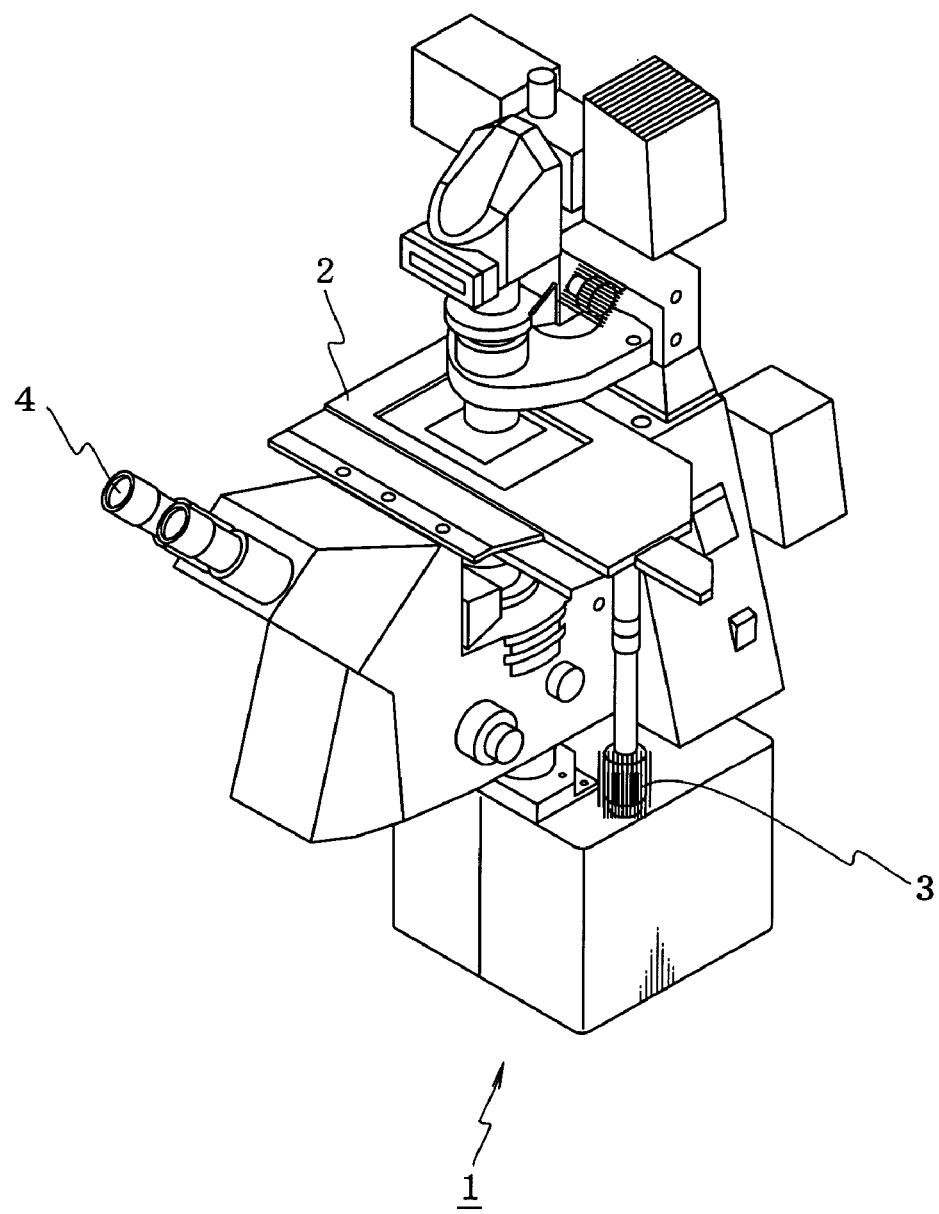
FIG. 1 is a diagram showing one example of an existing microscope.
Figure 2A:
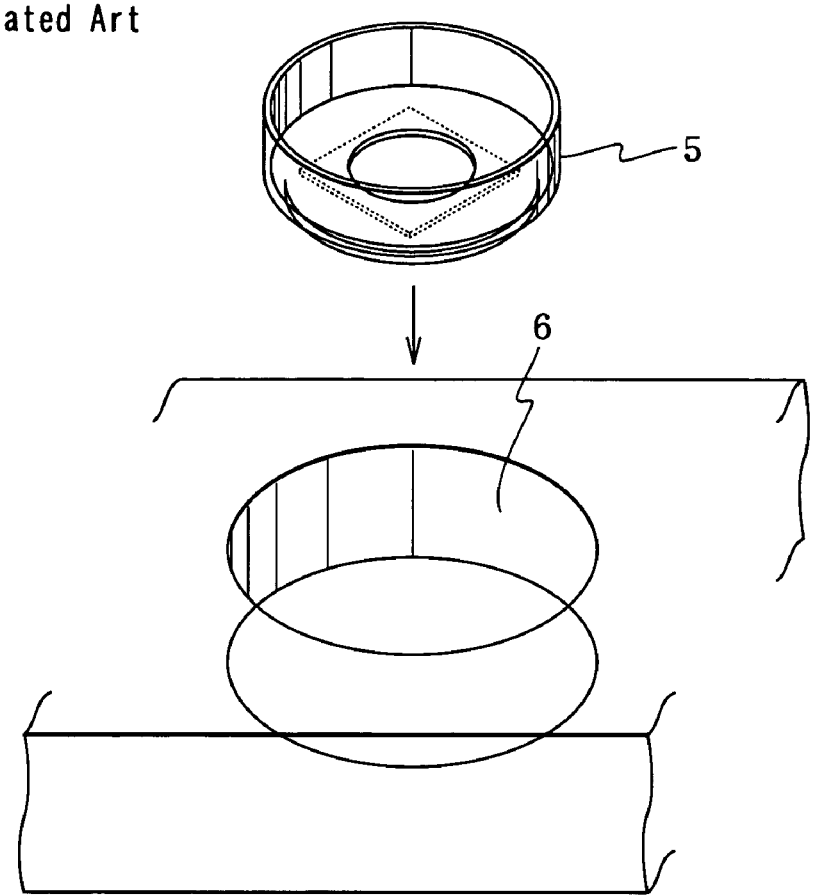
FIGS. 2A and 2B are diagrams showing relationship between a glass bottom dish on which a sample is mounted and a recess that is for use in the glass bottom dish and disposed on a stage of a microscope.
Figure 2B:
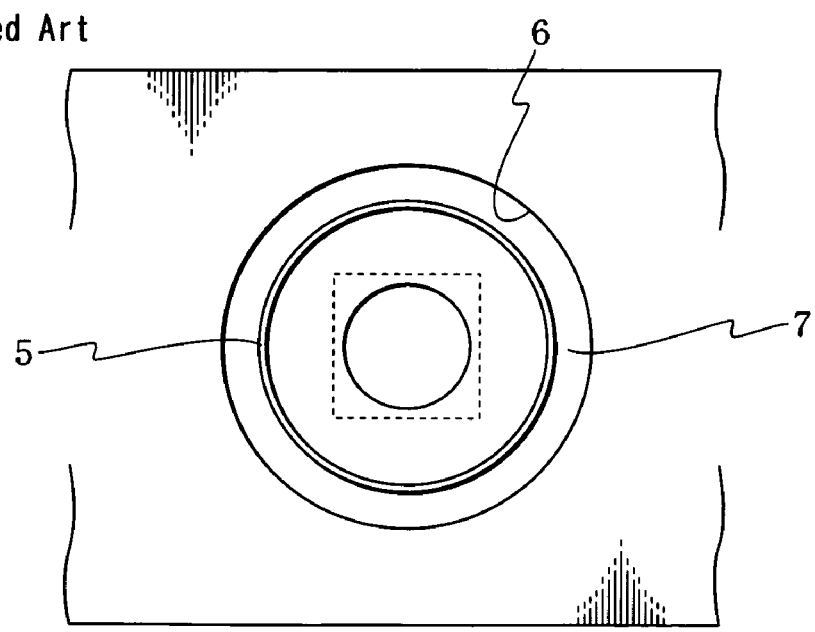
Figure 3:
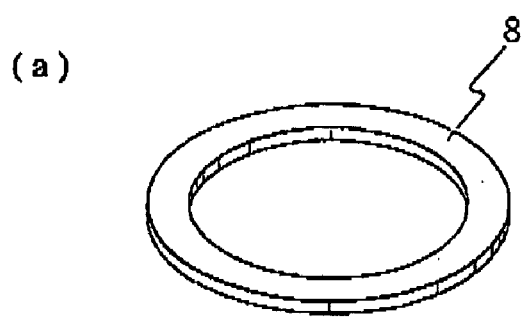
FIGS. 3A and 3B are diagrams showing examples of a displacement prevention sheet according to the invention.
Figure 3:
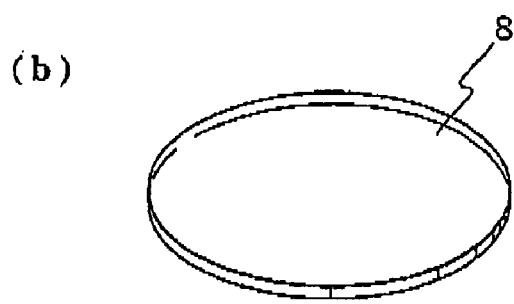

The embodiments according to the present invention will be detailed with reference to the drawings. FIGS. 3A and 3B each are diagrams showing an example of displacement prevention sheet according to the invention.

A shape of a displacement prevention sheet according to the invention is not restricted to any particular one. For instance, hollow circular one such as shown in FIG. 3A or circular one such as shown in FIG. 3B can be used. The hollow circular one such as shown in FIG. 3A is preferable. This is because in the circular one, at the measurement with a microscope, measurement light goes through the displacement prevention sheet according to the invention and an influence due to the displacement prevention sheet appears, however, in the case of the hollow circular one, such an influence is not caused.

A thickness of the displacement prevention sheet, as far as it has a relatively thin and substantially uniform thickness, is not particularly restricted. An adhesive resin sheet having a known thickness can be used. A thickness of the displacement prevention sheet is preferably in the range of 0.01 to 5 mm, more preferably 0.1 to 2 mm, further more preferably 0.2 to 0.5 mm, and particularly preferably 0.35 mm. This is because since an optical microscope is generally designed by calculating a predetermined optical path distance, when the displacement prevention sheet is too thick, there is a problem in that the optical path distance goes out of order.

In the case of the displacement prevention sheet being hollow circular one or circular one, a diameter of the displacement prevention sheet, as far as it is same as a diameter of a recess or smaller than that, is not particularly restricted. When a diameter of the displacement prevention sheet is same as a diameter of the recess, it is not easy to set the displacement prevention sheet in the recess. On the other hand, when the diameter of the displacement prevention sheet is too small in comparison with a diameter of the recess, displacement prevention effect cannot be expected so much and the stability of the glass bottom dish becomes bad. Accordingly, a diameter of the displacement prevention sheet is preferably smaller by 0.1 to 5 mm, more preferably by 0.5 to 3 mm, and particularly preferably by 1 to 2 mm in comparison with a diameter of the recess. As a specific diameter of the displacement prevention sheet, since as a diameter of a glass bottom dish 60 mm and 35 mm are cited and as a diameter of the recess of the micrometer substantially 65 mm or 40 mm are cited, ones having a diameter smaller by an abovementioned extent than these diameters can be cited.

In the case of the displacement prevention sheet being hollow circular one, a diameter of a bored circle is not particularly restricted, and one larger than a diameter of a hole portion (observing portion) disposed in the glass bottom dish can be cited. When such a magnitude is satisfied, at the observation with a microscope, since the displacement prevention sheet is never observed, an influence that the displacement prevention sheet exerts on an observed image can be excluded.

At least on one surface of the displacement prevention sheet, displacement prevention means are disposed. The "at least one surface" means, among surfaces of the displacement prevention sheet, one or both of a surface that comes into contact with part of a microscope and a surface that comes into contact with a sample holder. These surfaces may be surfaces that have substantially same physical properties or chemical properties or surfaces that have different physical properties or different chemical properties. As the "part of a microscope" in the "surface that comes into contact with part of a microscope", a bottom of a recess disposed on a sample holder mounting stage for disposing the glass bottom dish can be cited. As the "sample holder" in the "surface that comes into contact with a sample holder", a sample holder for measurement due to a known microscope can be cited. For instance, a glass bottom dish can be cited.

As examples of the displacement prevention means, one in which at least one surface of the displacement prevention sheet is formed from an adhesive resin, one in which on a surface of at least one surface of the displacement prevention sheet displacement prevention process is applied and thereby a surface takes a special physical shape, and one in which at least one surface of the displacement prevention sheet is an adhesive member can be cited.

Figure 4:
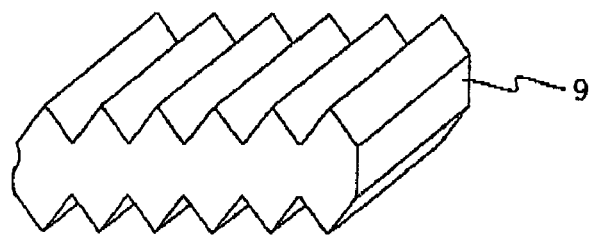
FIGS. 4A to 4D each are diagrams showing a surface shape of a displacement prevention sheet and an example of configuration of the displacement prevention sheet.
Figure 4:
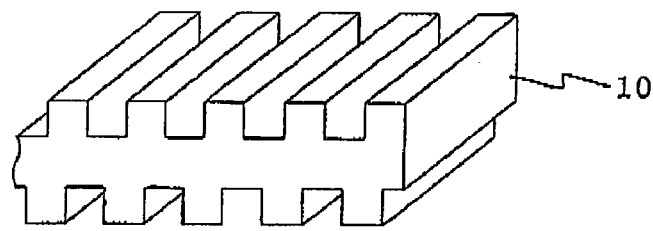
Figure 4:
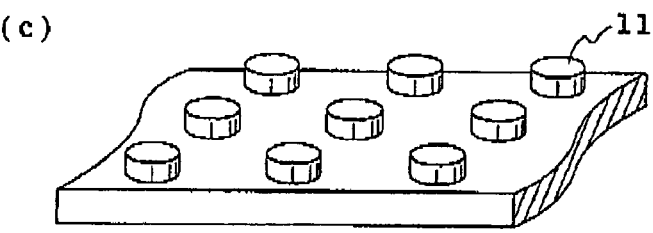
Figure 4:
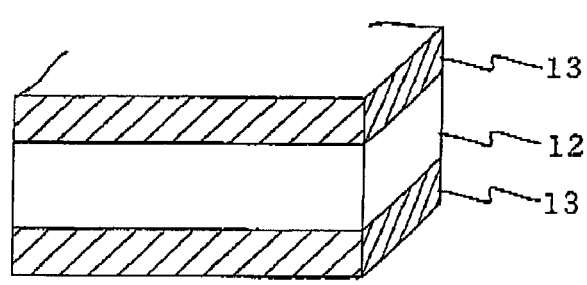

In FIGS. 4A to 4D, examples of surface shape of the displacement prevention sheet and configuration of the displacement prevention sheet are shown. The shape of the displacement prevention sheet is not particularly restricted. One in which as shown in FIG. 4A a plurality of prisms 9 is mounted on a sheet or integrally molded with a sheet; one in which as shown in FIG. 4B a plurality of rectangular portions 10 is mounted on a sheet or integrally molded with a sheet; and one in which as shown in FIG. 4C a plurality of columnar projections 11 is mounted on a sheet or integrally molded with a sheet can be cited. As a shape of the columnar projection, known shapes such as a cylindrical one and rectangular columnar one can be selected. A configuration of the displacement prevention sheet, as shown in FIG. 4D, may be one that contains a sheet portion 12 and an adhesive member 13. The adhesive member may be disposed on both surfaces of the displacement prevention sheet or on only one surface thereof.

A color of the displacement prevention sheet is not particularly restricted. However, it is preferable to be one that does not adversely affect on the measurement that uses a microscope. Accordingly, a color of the displacement prevention sheet is preferably colorless and transparent, white, gray or colored and transparent, more preferably colorless and transparent or white, and particularly preferably colorless and transparent.

The hardness of the displacement prevention sheet is not particularly restricted. The hardness by, for instance, an ASKER C penetrometer is in the range of 5 to 20°, preferably in the range of 10 to 18°, more preferably in the range of 12 to 16° and most preferably 14°.

The adhesive force of a surface of the displacement prevention sheet is not restricted to particular value. However, it is preferably in the range of 10 to 1000 gf/10 mm, and more preferably 100 to 500 gf/10 mm. This is because when the adhesive force is substantially in this range, the glass bottom dish can be inhibited from deviating and the displacement prevention sheet can be taken off the microscope. The adhesive force can be measured by use of a known pick-up type tack-meter.

A material of the displacement prevention sheet is not restricted to particular one. Plastics or metals can be used. Plastics are preferable. The plastics that can be used in the displacement prevention sheet include such as acrylonitrile-butadiene-styrene resin, acrylic acid ester rubber, acrylonitrile-chlorinated polyethylene-styrene, atactic polypropylene, acrylonitrile-styrene copolymer, acrylonitrile-styrene-acrylate, biaxially oriented polypropylene, cis-1,4 polybutadiene rubber, chlorinated polyethylene, chloroprene rubber, ethylene methacrylic acid, epoxy resin, ethylene-propylene-diene methylene linkage, ethylene-vinyl acetate copolymer, isoprene rubber, methyl methacrylate-butadiene-styrene resin, polyamide, polybutadiene acrylonitrile, poly-n-butyl methacrylate, polybutadiene styrene, polybutylene terephthalate, polycarbonate, polyethylene, polyethylene terephthalate, polymethyl methacrylate, polypropylene, polypropylene copolymer, polyvinyl alcohol, polyvinyl acetate, polyvinyl butyral, styrene-acrylonitrile copolymer, styrene-butadiene rubber, styrenic-block copolymer, styrene-butadiene-styrenic block copolymer, styrene-isoprene-styrenic block copolymer, ethylene-ethyl-acrylate and ethylene-vinyl acetate copolymer, and these may be used singularly or in combination of at least two kinds. As the materials of the displacement prevention sheet, preferable ones are known adhesive plastics, and particularly preferable ones are ethylene-ethyl-acrylate and ethylene-vinyl acetate copolymer. As materials of the displacement prevention sheet, known resin additives such as a thermal stabilizer, a plasticizer, a lubricant, an oxidation inhibitor, a filler and a pigment may be blended.

An adhesive member when an adhesive member is disposed on at least one surface of the displacement prevention sheet is not restricted to particular one. For instance, adhesive members that are used in known adhesive tapes can be used. Furthermore, clay-like material such as butyl rubber (such as clay material having trade name of MR. PETARI) may be used.

The displacement prevention sheet is preferable to be one in which even in the case of a surface on which the displacement prevention means are disposed being contaminated and thereby the displacement prevention capacity (such as adhesive force) of the displacement prevention means being damaged, by cleaning with cloth or a cotton bud impregnated with water, the displacement prevention capacity (such as adhesive force) can be recovered. This way, the displacement prevention sheet can be used as it is fitted to the microscope and there is no need of frequently exchange it.

A method of manufacturing a displacement prevention sheet is not restricted to particular one. Known methods of manufacturing metal films or plastic films can be adopted. As a method of manufacturing a displacement prevention sheet, drawing, extrusion molding, injection molding or calender molding followed by processing the sheet can be preferably cited. Furthermore, a commercially available resin sheet may be trimmed with a pair of scissors or a cutter to form a displacement prevention sheet.

Figure 5:
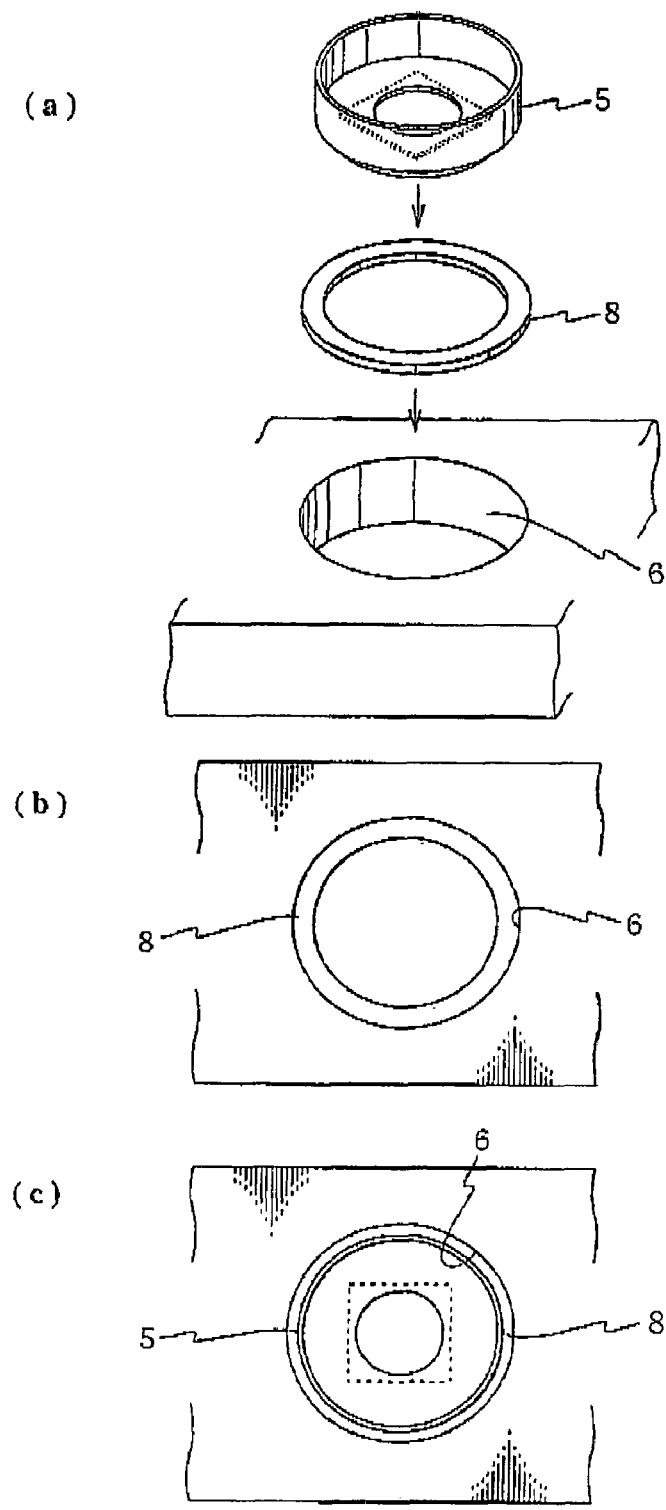
FIGS. 5A to 5C each are diagrams showing an example of an application method of a displacement prevention sheet according to the invention.

In FIGS. 5A to 5C, schematic diagrams each showing a method of applying the displacement prevention sheet according to the invention are shown. As a method of applying the displacement prevention sheet according to the invention, a method in which, as shown in FIG. 5A, a displacement prevention sheet 8 according to the invention is set in a recess 6 so as to fit followed by setting a glass bottom dish 5 that is a sample holder in the recess 6 on a stage can be cited.

FIG. 5B is a diagram showing one example of relationship between the displacement prevention sheet and the recess when the displacement prevention sheet 8 according to the invention is set in the recess 6 on the stage. As shown in FIG. 5B, the displacement prevention sheet 8 according to the invention is disposed so as to fit in the recess 6.

FIG. 5C is a diagram showing an example of relationship between the recess 6, the displacement prevention sheet 8 and the glass bottom dish 5 when, subsequent to FIG. 5B, the glass bottom dish 5 is disposed in the recess 6. As shown in FIG. 5B, at least part of the glass bottom dish 5 comes into contact with the displacement prevention sheet 8. Owing to friction effect of the displacement prevention sheet 8, the glass bottom dish 5 is inhibited from deviating. Accordingly, at the measurement with a microscope, a sample in the glass bottom dish 5 can be inhibited from deviating or made less in the deviation of the sample, resulting in enabling to more accurately observe.

As a microscope that is provided with a displacement prevention sheet according to the invention, a known microscope can be used. As such a microscope, one in which a sample is mounted on a glass substrate (slide glass) and thereon a thin glass plate such as a cover glass is put on or one that has a recess for burying the glass bottom dish on the stage can be cited; the latter one is preferable. As examples of the latter one, an optical microscope, a confocal laser scanning microscope and so on can be cited.

A microscope equipped with the displacement prevention sheet according to the invention can be preferably used for observing all kinds of samples, for measuring a biological sample, and in particular for measuring a biological sample over a long time. That is, a method of measuring a biological sample with a microscope on which the displacement prevention sheet according to the invention is mounted can inhibit a sample from deviating during the measurement and thereby enables to carry out the measurement properly. A method (the inventive measurement method) of measuring a biological sample with a microscope on which the displacement prevention sheet according to the invention is mounted is not restricted to particular one. That is, measurements of all kinds of biological samples such as a measurement of a live cell or a measurement of a dead cell can be cited. For instance, measurement over a long time (such as one hour or more) can be cited, and more specifically measurements of a biological sample by means of FRET, FRAP, or FLIP can be cited.

FRET is an abbreviation of Fluorescence Resonance Energy Transfer and indicates a phenomenon in which under a circumstance where two kinds of fluorescent molecules of which fluorescence wavelengths are in proximity to some extent are in proximity to each other, light energy of an excited fluorescent molecule (donor) moves to a remaining fluorescent molecule (acceptor). When the phenomenon is utilized, a fine change in a cell can be captured. In the FRET measurement, ordinarily, the change with time is also measured. Accordingly, the measurement method according to the invention is preferable because at the time of FRET measurement over a long time, a sample can be inhibited from unexpectedly deviating.

FRAP indicates Recovery of Fluorescence After Photobleaching. In the FRAP measurement, when a fluorescence probe is moved from outside of a particular region that is not bleached, fluorescence of the bleached region recovers. When this situation is measured with time, a situation where a molecule or the like moves can be observed by visualizing by fluorescence. Accordingly, the measurement method according to the invention is preferable because at the time of FRAP measurement over a long time, a sample can be inhibited from unexpectedly deviating.

FLIP means Fluorescence Loss In Photobleaching. The FLIP measurement is a method in which a particular region is repeatedly bleached, a situation where fluorescence in a region separate therefrom disappears is observed, and thereby a situation where a molecule or the like moves is measured. The measurement method according to the invention is preferable because at the time of FLIP measurement over a long time, a sample can be inhibited from unexpectedly deviating.

As mentioned above, as the method of measuring a biological sample according to the invention, FRET, FRAP and FLIP are specifically cited. However, as mentioned above, the measurement method according to the invention, as far as it is one in which a sample can be alleviated in moving during measurement by use of a displacement prevention sheet and a microscope that is provided with the displacement prevention sheet, is not restricted to these measurement methods.

EMBODIMENTS

Embodiment 1

Preparation of Displacement Prevention Sheet

A sheet having a substantially hollow circular shape having an outer diameter of 40 mm and an inner diameter of 35 mm was cut with a pair of scissors from a super-clear tack sheet (trade name: T/G SHEET, manufactured by Exseal Corporation Co., Ltd.). The super clear tack sheet is one in which on both surfaces of a PET sheet, an adhesive layer of urethane is disposed, and further thereon a PET thin film is disposed as a surface protective layer.

The hardness of the super-clear tack sheet was 14° by ASKER C penetrometer, the adhesive force thereof was 270 gf/14 mm, and the surface roughness thereof was #80.

Embodiment 2

Microscope with a Displacement Prevention Sheet and Measurement of a Biological Sample By Use of Such Microscope A displacement prevention sheet that is manufactured according to a first embodiment was set on a bottom surface of a recess on a stage of a fluorescence microscope LSM510 META manufactured by Carl Zeiss Jena GMBH, and thereby a new microscope was manufactured.

Figure 6:
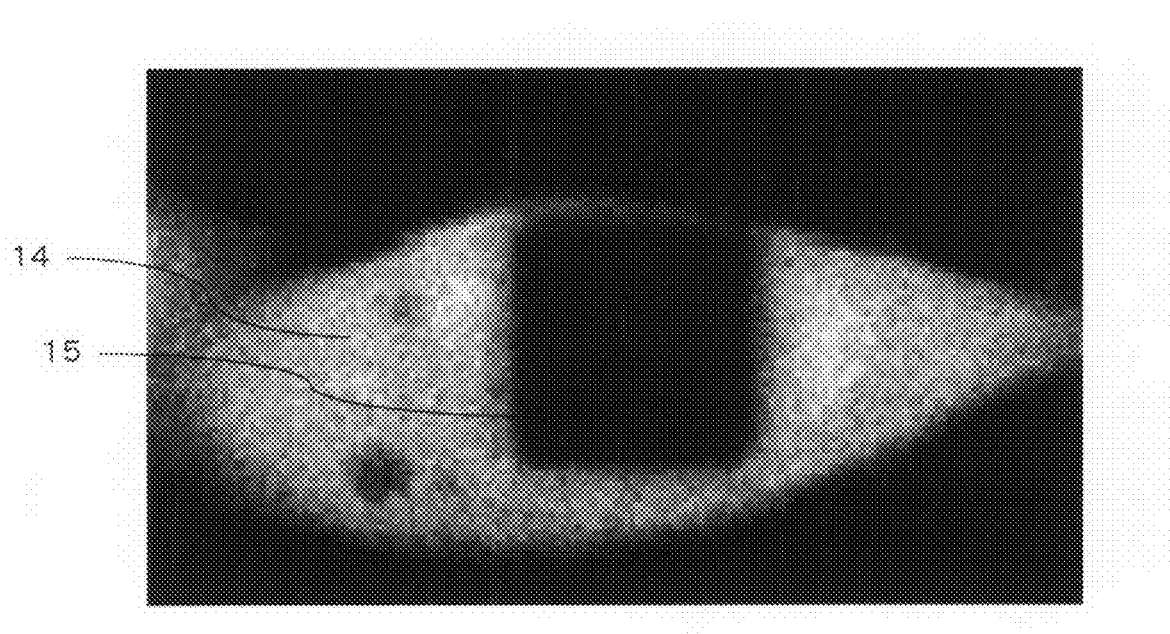
FIG. 6 is a photograph in place of the drawing of a human cell in which, in a second embodiment, fluorescence in a certain region is discolored by laser.

A human cell that has developed GFP (Green Fluorescent Protein) was fixed on a glass bottom dish. The glass bottom dish was set on the above microscope. Thereafter, to the human cell, argon laser having a wavelength of 488 nm was illuminated and thereby fluorescence in a region of 2 μm square was bleached. FIG. 6 is a human cell in a certain region the fluorescence of which having been bleached by use of laser. Thereafter, the sample was observed every 300 sec.

Though not particularly shown in the drawing, a position at a corner of a portion the fluorescence of which having been bleached by use of laser is taken as ROI1 and a position 1 μm distant therefrom was taken as ROI2. The fluorescence intensity becomes weaker as a measurement time elapses. Accordingly, ROI2 is a reference point for the fluorescence intensity becoming weaker with time.

Figure 7:
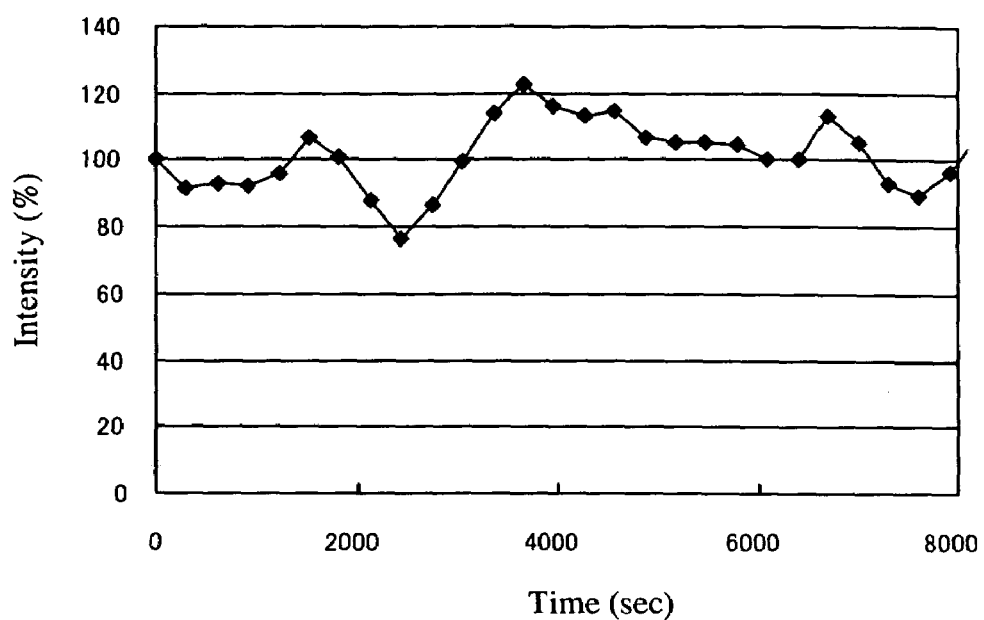
FIG. 7 is a graph showing results of fluorescence measurement of a human cell in the second embodiment.

FIG. 7 shows fluorescent measurements of the human cell. In FIG. 7, with an initial fluorescence intensity of ROI1 as 100 and with a change of the fluorescence intensity of ROI2 as a correction factor, the fluorescence intensity of ROI1 after the correction is shown. As found from FIG. 7, the fluorescent intensity was substantially constant even after 8000 sec, that is, it is found that the sample did not deviate. The displacement of a portion where the fluorescence on the human cell was bleached was at maximum 0.7 μm.

COMPARATIVE EXAMPLE 1

Figure 8:
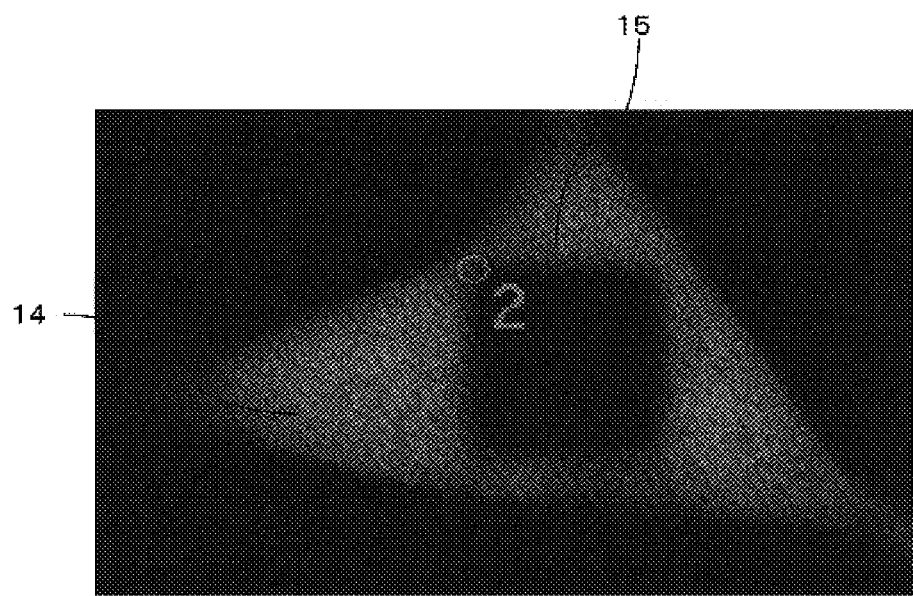
FIG. 8 is a photograph in place of the drawing of a human cell in which, in a comparative example 1, fluorescence in a certain region is discolored by laser.
Figure 9:
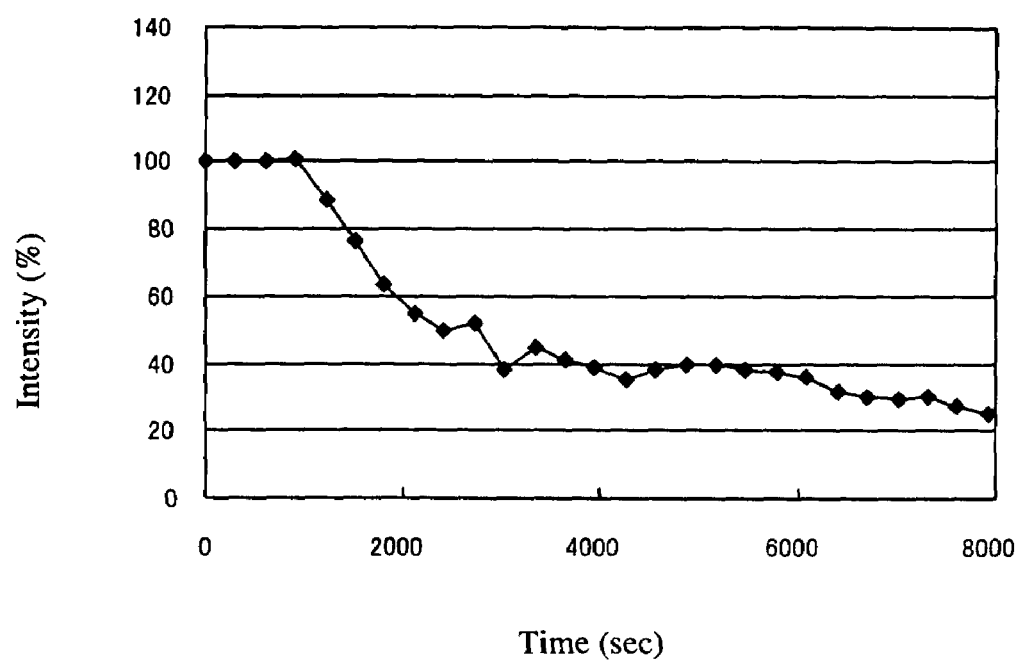
FIG. 9 is a graph showing results of fluorescence measurement of a human cell in the comparative example 1.

Except for not using a displacement prevention sheet, similarly to a second embodiment, the fluorescence on a human cell was observed (FIG. 8), and the fluorescence intensity was observed with time (FIG. 9). In FIG. 8, a point expressed by O1 corresponds to ROI1 and a point expressed with O2 corresponds to ROI2. As a result, the fluorescence intensity after the correction became weaker with time and, after substantially 3000 sec, became a low substantially constant value. The measurement results are because the sample deviated with time and after 3000 sec a measurement point completely moved to a portion where the fluorescence on the human cell was bleached. That is, it is confirmed that in the observation in which the displacement prevention sheet was not used, a measurement sample deviated during the measurement. A displacement of a portion where the fluorescence on the human cell was bleached was 3.6 μm at maximum.

The displacement prevention sheet according to the present invention can inhibit a measurement target sample from moving during the measurement by use of a microscope; accordingly, by use of a known microscope, the measurement accuracy thereof can be improved.

It goes without saying that the displacement prevention sheet according to the invention can be used not only in an ordinary microscope but also preferably in a microscope (such as a microscope that uses a glass bottom dish) that is used in the observation of in particular a biological sample.

A microscope provided with the displacement prevention sheet according to the invention, being high in measurement accuracy and thereby making correction unnecessary, can be used in known measurement methods and can be preferably used in measurement of a very small region of in particular a biological sample over a long time.

A measurement method that uses a microscope provided with the displacement prevention sheet according to the invention can alleviate a situation where a measurement target sample moves during the measurement; accordingly, all kinds of samples can be improved in the measurement accuracy, and the number of required corrections can be minimized. Such a measurement method can be preferably used in particular in a measurement method of a biological sample where a measurement over a long time is necessary and a very small region is observed.

What is claimed is:

1. A displacement prevention sheet having a front surface and a reverse surface, which is placed between a sample holder and a sample holder mounting stage that mounts the sample holder, for inhibiting a sample from deviating during a measurement with a microscope,
    wherein at least part of both surfaces of the displacement prevention sheet has displacement prevention means.

2. The displacement prevention sheet according to claim 1, wherein the displacement prevention sheet has a hollow circular shape.

3. The displacement prevention sheet according to claim 1, wherein the displacement prevention means is a portion consisting of an adhesive resin.

4. The displacement prevention sheet according to claim 1, wherein the displacement prevention means comprises an adhesive force, and an adhesive force of at least one surface is in the range of 10 to 1000 gf/10 mm.

5. The displacement prevention sheet according to claim 1, wherein the displacement prevention means are an adhesive member.

6. The displacement prevention sheet according to claim 1, wherein the displacement prevention sheet has a hollow circular shape of which diameter is in the range of 60 to 64.9 mm or 35 to 39.9 mm.

7. A microscope, comprising:
    the displacement prevention sheet according to claim 1.

8. The microscope according to claim 7, wherein the microscope has on a stage a cylindrical recess for mounting a glass bottom dish, and the displacement prevention sheet is disposed in the recess.

9. A measurement method for measuring a sample, comprising:
    a step of observing a sample using the microscope according to claim 7 or 8.

10. A measurement method of a biological sample, comprising:
    a step of observing a sample using the microscope according to claim 7 or 8.

* * * * *